United States Patent
Labatte et al.

[11] Patent Number: 5,901,285
[45] Date of Patent: May 4, 1999

[54] HIERARCHICAL ERASURE KEY PROTECTION FOR COMPUTER SYSTEM DATA

[75] Inventors: Timothy E. W. Labatte; Orville H. Christeson, both of Portland; Mark S. Shipman, Hillsboro, all of Oreg.

[73] Assignee: Intel Corporation, Santa Clara, Calif.

[21] Appl. No.: 08/769,227

[22] Filed: Dec. 18, 1996

[51] Int. Cl.$^6$ .................................................. G06F 12/14
[52] U.S. Cl. ......................................................... 395/186
[58] Field of Search .............................. 395/186, 188.01; 364/222.5, 286.4, 286.5; 326/8; 380/3, 4; 711/163, 164

[56] References Cited

U.S. PATENT DOCUMENTS

| | | | |
|---|---|---|---|
| 5,388,156 | 2/1995 | Blackledge et al. | 380/4 |
| 5,388,267 | 2/1995 | Chan et al. | 395/700 |
| 5,555,373 | 9/1996 | Dayan et al. | 395/188.01 |
| 5,574,786 | 11/1996 | Dayan et al. | 380/4 |
| 5,742,758 | 4/1998 | Dunham et al. | 395/186 |

OTHER PUBLICATIONS

American Megatrends Inc. et al., "Desktop Management BIOS Specification, Ver. 2.0", pp. 1–49, Mar. 1996.

Jex, "Flash Memory BIOS For PC And Notebook Computers", IEEE, pp. 692–695, May 1991.

Caceres et al., "Operating System Implications of Solid–State Mobile Computers", IEEE, pp. 21–27, Oct. 1993.

Compaq Computer Corp. et al., "Plug and Play BIOS Specification", Ver. 1.0A, http://www.dmtf.org/document/indstd/pnp/bio 10a.doc, pp. 1–64, May 1994.

Intel Corp., "Guide to Flash Memory Reprogramming", Appl. Note AP–325, pp. 432–454, May 1989.

American Megatrends Inc. et al., "Desktop Management BIOS Specification", Ver. 2.00.1, pp. 1–50, Jul. 1996.

*Primary Examiner*—Robert W. Beausoliel, Jr.
*Assistant Examiner*—Stephen C. Elmore
*Attorney, Agent, or Firm*—William H. Murray; N. Stephan Kinsella

[57] ABSTRACT

A request to erase a storage area of a computer system is received via an erase call by a caller, the erase call containing an erasure key. The storage area is erased only if the erasure key matches a master erasure key corresponding to the storage area. A request is received to perform a write to the storage area, and the write is allowed only if the storage area has been erased.

24 Claims, 2 Drawing Sheets

100

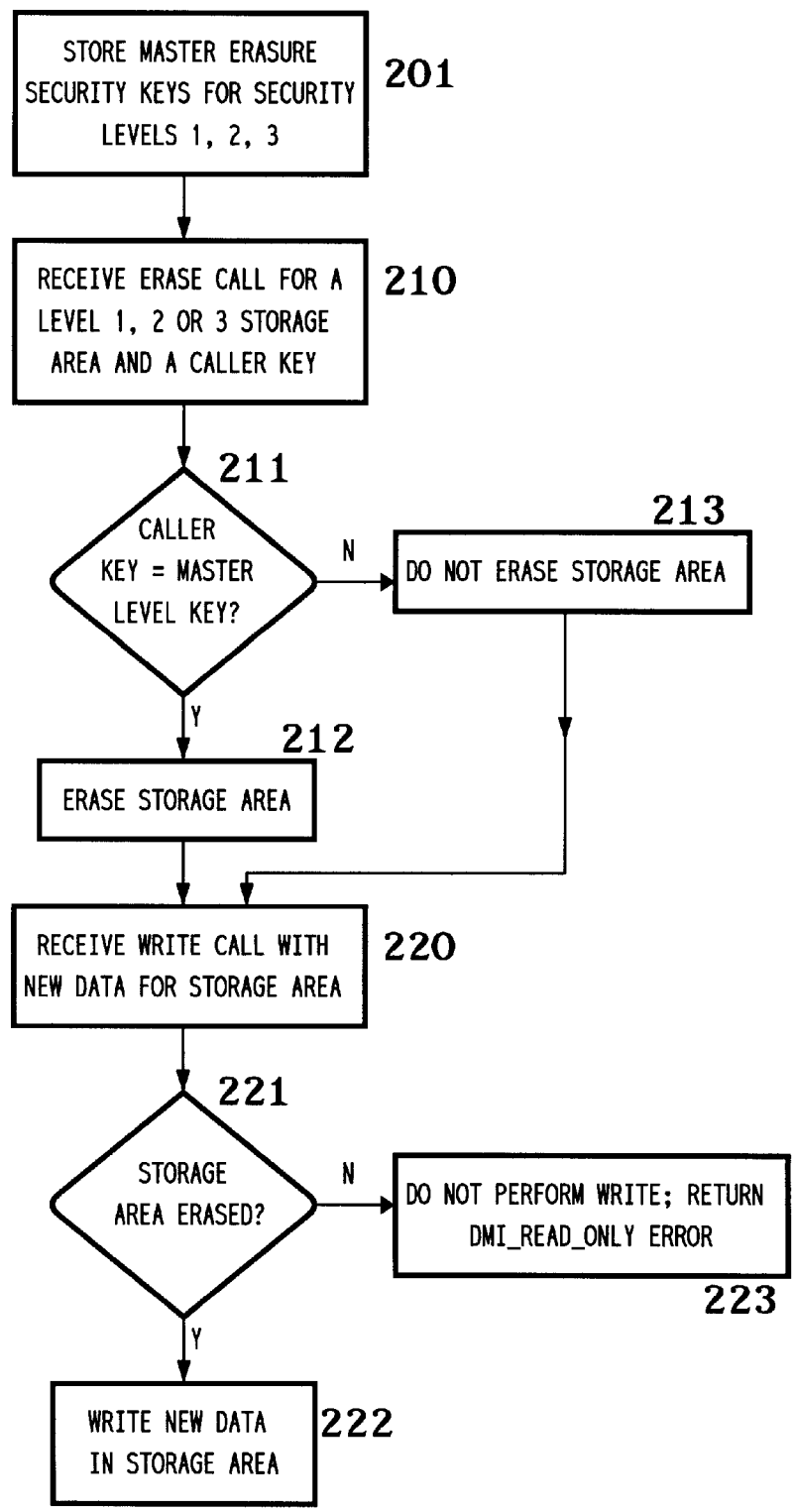

HIERARCHICAL ERASURE KEY PROTECTION FOR COMPUTER SYSTEM DATA

BACKGROUND OF THE INVENTION

1. Field of the Invention

The present invention relates to the field of data storage in a computer system and, more particularly, to prevention of unauthorized changes to data stored in a computer system.

2. Description of the Related Art

Computer technology is continuously advancing, resulting in modern computer systems that provide ever-increasing performance. One result of this improved performance is an increased use of computer systems by individuals in a wide variety of business, academic and personal applications. With the increased use of and demand for computer systems, a large number of manufacturers, developers, and suppliers of computer systems, components, and software have come into existence to service the demand.

The large number of manufacturers, developers, and suppliers, combined with the flexibility afforded them due to the advances in technology, has resulted in a wide range of methods by which computer systems operate. Typically, in order for different components within a computer system to work together effectively, each must agree on certain specific operating parameters. Often, standards or specifications are adopted or agreed upon by various industries or groups of companies which define certain operating parameters. Thus, if two components comply with the same standard(s) or specification(s), then the two components should be able to work together effectively in the same system.

For example, one such standard is the Plug and Play BIOS [basic input/output system] Specification (version 1.0A, May 5, 1994). A component which conforms to the Plug and Play BIOS Specification should work properly in a system which also complies with the Plug and Play BIOS Specification by simply interconnecting the components to the system. Components that do not comply with the Plug and Play BIOS Specification may require additional configuration steps to be taken by the user before they function properly with one another.

Another current standard is the Desktop Management BIOS Specification (version 2.0, published Mar. 6, 1996) (hereinafter referred to as the DMI BIOS Specification), the entirety of which is incorporated herein by reference. This specification includes a Desktop Management Interface (DMI). The DMI BIOS Specification provides, among other advantages, general purpose nonvolatile (GPNV) data areas which can be accessed to store various data by various applications running on the system.

The DMI BIOS Specification, however, lacks suitably flexible mechanisms to prevent an application from performing an unauthorized modification of data stored in one of these GPNV data areas. For example, a GPNV data area may store vital manufacturing data the modification of which may be done for fraudulent purposes. Thus, it would be beneficial to provide mechanisms for restricting write access to selected GPNV data areas to prevent unauthorized changes to the data stored therein.

Additionally, in order to maintain compliance with the DMI BIOS Specification, any protection against unauthorized updates to GPNV data areas must not violate the DMI BIOS Specification.

SUMMARY

Unauthorized write access to a storage area in a computer system is prevented by receiving a request to erase the storage area via an erase call by a caller, the erase call containing an erasure key. The storage area is erased only if the erasure key matches a master erasure key corresponding to the storage area. A request is received to perform a write to the storage area, and the write is allowed only if the storage area has been erased.

BRIEF DESCRIPTION OF THE DRAWINGS

These and other features, aspects, and advantages of the present invention will become more fully apparent from the following description, appended claims, and accompanying drawings in which:

FIG. 2 is a flow chart illustrating a method of protecting storage areas from unauthorized writes by using hierarchical erasure security keys, in accordance with an embodiment of the present invention.

DESCRIPTION OF THE PREFERRED EMBODIMENT

Figure 1:
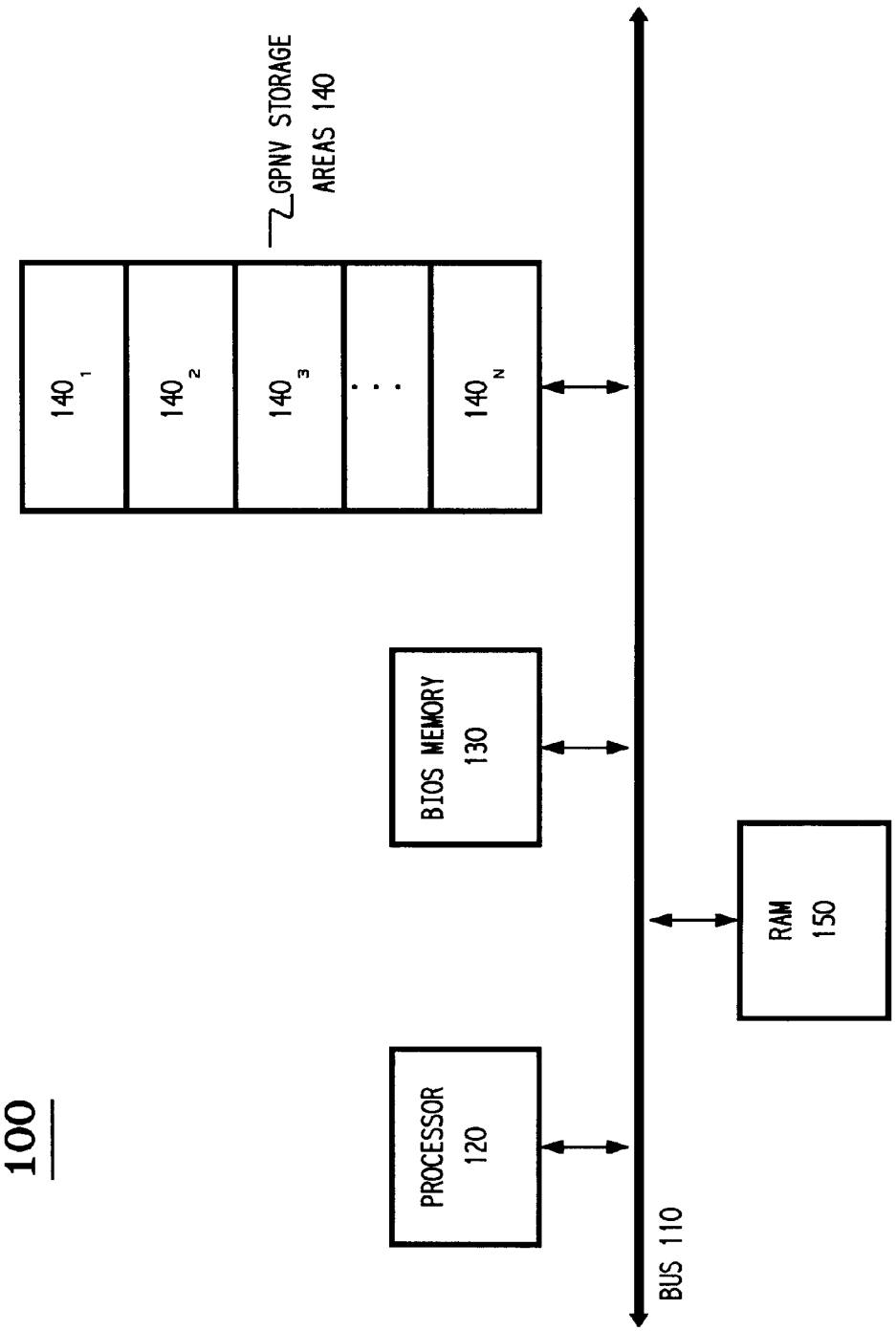
FIG. 1 shows a block diagram of a computer system in accordance with an embodiment of the present invention.

The present invention provides a mechanism for protecting data saved in a storage area from unauthorized writes by using hierarchical erasure security keys. When a request is received in an erase call by BIOS to erase the data in a storage area, the erase call must contain a security key that matches a master key corresponding to the storage area for the erase to be allowed. When BIOS receives a write call from a caller to write new data to the storage area, the write is allowed only if the storage area is blank, i.e. has been erased. The above-described mechanism is implemented, in one embodiment, on a computer system such as computer system 100 depicted in block diagram form in FIG. 1.

System Hardware

Computer system 100 comprises a bus 110, a processor 120, a BIOS memory 130, GPNV data storage 140, and a random access memory (RAM) 150, interconnected as shown. The BIOS memory 130 stores a sequence of instructions (sometimes referred to as the BIOS) which allows the processor 120 to input data from and output data to input/output (I/O) devices such as display devices and mass storage devices (not shown). In one embodiment, when the system 100 is reset, the contents of BIOS memory 130 are copied into RAM 150 for access by the processor 120. Alternatively, processor 120 may access the BIOS memory 130 directly via bus 110. The BIOS memory 130 can be any of a wide variety of conventional nonvolatile data storage devices, such as a read only memory (ROM), Flash memory (sometimes referred to as Flash devices), an erasable programmable read only memory (EPROM) or an electrically erasable programmable read only memory (EEPROM).

In one embodiment of the present invention, the BIOS stored in BIOS memory 130 is compliant with the DMI BIOS Specification. The DMI BIOS Specification includes a DMI, which uses GPNV data areas, shown in FIG. 1 as GPNV storage areas 140. Thus, when an application desires access to the GPNV storage areas 140, it must issue one or more DMI calls to one of the procedures provided by the BIOS. These procedures are described in more detail below.

Multiple GPNV storage areas 140 can be used in a computer system. The system 100 as shown includes n GPNV storage areas 140. In one implementation, n is equal to three. Each of the GPNV areas 140 can be of any size. The GPNV storage areas 140 can be used to store any of a wide variety of information. In one embodiment, the GPNV storage areas 140 are used to store data relating to the identification of hardware components in the system 100. For example, this identification can include the serial numbers and model numbers of each piece of hardware (e.g., display devices, mass storage devices, multimedia cards, and the like) in the system 100.

DMI Function Calls

DMI supports a structure access interface and a GPNV storage interface. Various types of information may be stored in GPNV memory and accessed by the GPNV storage interface, for example through DMI functions 56h (Read GPNV), which reads the entire specified GPNV contents into a buffer specified by the caller; and 57h (Write GPNV), which copies the contents of a user-specified buffer into the specified GPNV memory. Such function calls contain a "handle" to the GPNV storage area of which the read (or write) is requested, and the address of a buffer in which the data is to be stored (or containing the new data to be written). DMI function 55h (Get GPNV Information) returns information to a caller about a specified GPNV storage area. The information stored in GPNV storage areas may include manufacturing information, such as the serial number of the motherboard. Data stored in GPNV storage areas that is accessible via the GPNV storage interface will be referred to herein as GPNV data.

"Structures," sometimes referred to as strings because of the strings of data stored therein, may also be stored in GPNV memory and accessed by the structure access interface, for example through DMI function 52h (Set DMI Structure), which copies the information for the specified DMI structure from the buffer specified by the caller. These structures are organized in Types and may also contain sensitive information. These Types include system information (Type 1), which defines attributes of the overall system; base board information (Type 2), which defines attributes of the system's baseboard, also known as the motherboard or planar; and system enclosure or chassis information (Type 3), which defines attributes of the system's mechanical enclosures. Each DMI structure has a formatted section and an optional unformatted section. The formatted section of each structure begins with a 4-byte header. Remaining data in the formatted section is determined by the structure Type, as is the overall length of the formatted section. The unformatted section of the structure is used for passing variable data such as text strings. A DMI_Bad_Parameter return code (value 84h) is returned after various calls are made, to indicate an invalid parameter or, in the case of a DMI function 52h (Set DMI Structure), to indicate an invalid value detected for a to-be-changed structure field. Data stored in DMI structures, which may be stored within a dedicated GPNV storage area, will be referred to herein as structure data.

DMI also provides a control function 54h, which provides an interface to perform implementation-specific functions, as defined by a SubFunction parameter and its optional Data values. In particular, SubFunction range 4000h-FFFFh is reserved for use by BIOS.

In one embodiment, one of the GPNV areas 140 is 128 bytes, a second is 256 bytes, and a third is 384 bytes. The GPNV storage areas 140 can be implemented using any of a wide variety of nonvolatile storage devices, such as blocks of Flash memory cells, EEPROMs, battery-backed complimentary metal oxide semiconductor (CMOS) cells, and the like. Each GPNV storage area may be identified using a 4-byte ASCII identifier. Thus, GPNV storage area $140_1$ may identified by the identifier "ABCD", storage area $140_2$ by "ABXY", and storage area $140_3$ by "GGYN". In one embodiment, GPNV storage area $140_1$ is a 256-byte storage area used by the BIOS for storing a backup image of CMOS-related information; GPNV storage area $140_2$ is a 128-byte storage area used by the manufacturer for storing process and test data; and GPNV storage area $140_3$ is a 384-byte storage area used by DMI BIOS extensions for storing DMI-related information such as manufacturer ID, serial numbers, asset tags, and chassis information, which may be read using the DMI function call 56h (Read GPNV Data) or 51h (Get DMI Structure) and written with DMI function call 52h (Set DMI Structure). Thus, GPNV storage area $140_3$ may be utilized to store the structure data of Types 1, 2, and 3, described previously.

In one embodiment, GPNV storage area $140_3$ stores a 4-byte header plus four strings for each of Types 1, 2, and 3 structures, in addition to other information. In one embodiment, GPNV storage area $140_3$ stores, at predetermined offsets, the following strings as illustrated in Table 1, in addition to other information:

TABLE 1

| Name | Structure Type | String Number |
| --- | --- | --- |
| System Info Manufacturer | 1 | 1 |
| System Info Product Name | 1 | 2 |
| System Info Version | 1 | 3 |
| System Info Serial Number | 1 | 4 |
| Base Board Manufacturer | 2 | 1 |
| Base Board Product | 2 | 2 |
| Base Board Version | 2 | 3 |
| Base Board Serial Number | 2 | 4 |
| Chassis Manufacturer | 3 | 1 |
| Chassis Version | 3 | 2 |
| Chassis Serial Number | 3 | 3 |
| Chassis Asset Tag | 3 | 4 |

Hierarchical Erasure Security Keys

Referring now to FIG. 2, there is shown a flow chart illustrating a method 200 of protecting storage areas such as GPNV storage areas 140 from unauthorized writes by using hierarchical erasure security keys, in accordance with an embodiment of the present invention.

As shown in FIG. 2, a call is made by a caller to write data to one of the strings of a structure of Type 1, 2 or 3, as illustrated in Table 1, above. In one embodiment, when a caller desires to write a new string of data to a given DMI structure, a DMI function call 52h will be received by BIOS, to instruct BIOS to copy the string for the specified DMI structure to be updated from a buffer specified by the caller. In accordance with method 200, unauthorized writes or updates of such DMI structure strings are prevented by using hierarchical erasure security keys.

When BIOS receives a write call (function 52h) to overwrite a string of a Type 1, 2, or 3 Structure, the write is allowed only if the string is blank, i.e. has been erased. If the string, currently stored in the structure is not blank, BIOS rejects the function 52h Set_DMI_Structure call and returns a DMI_Read_Only error to the caller. The present invention thus prevents unauthorized writes of selected structure strings by preventing unauthorized erases of these strings. For a caller to successfully write new data to a string, therefore, the caller must first erase the structure data that is to be updated, and then execute a function 52h write call.

Erases of strings of Type 1, 2 or 3 structures are supported only by a "DMI Structure Element Erase" function which is implemented via DMI control function 54*h*, with a Sub-Function between the 4000h-FFFFh range. When a caller calls the DMI Structure Element Erase function, an erasure security key is passed to BIOS within a data structure provided by the caller, along with a pointer to the element that is to be erased (e.g., String 3 of Structure Type 2). If the erasure security key matches a master erasure security key that corresponds to that element, then the call is successful and BIOS erases the element. Thereafter, a write call to update the element can successfully be made, as explained above. However, if the erasure security key does not match the master erasure security key for that element, then the call is unsuccessful and the element is not erased. If the element is not erased, then subsequent write calls will be unsuccessful.

In one embodiment, a master erasure security key is a 24-byte alphanumeric key that is known only to the manufacturer, and multiple erasure security keys may be utilized for different strings. The master erasure security key(s) are stored in a GPNV storage area accessible only by BIOS.

In one embodiment, there are different erasure security keys for different structure elements, to provide for different levels of security. In this embodiment, the strings of Table 1 are divided into three security levels for write calls, as illustrated in Table 2, below, where security level 1 is the highest security level.

TABLE 2

| Security Level | Level Name | Rights | Write Requirements |
|---|---|---|---|
| 1 | Manufacturing | Erase any string of Structure types 1–3 | Manufacturing Erasure Security Key |
| 2 | Original Equipment Manufacturer (OEM) | Erase any string of Structure Types 1 or 3 | OEM Erasure Security Key |
| 3 | Administrator | Erase Chassis Asset Tag string (String 4 of Structure Type 3) | Administrative Erasure Security Key |

The lowest level of security is the Administrator level. This level (level 3) allows erasure of the Chassis Asset Tag string or element (String 4 of Structure Type 3 of Table 1) if the DMI Element Erase call passes an erasure security key that matches the master Administrative Erasure Security Key. The identify of the master Administrative Erasure Security key can be provided to administrators of computer systems, who are thereby rendered able to update the Chassis Asset Tag string. The OEM level is the next highest level of security. This level (level 2) allows erasure of any string of Structure Types 1 or 3 (including the Chassis Asset Tag string), if the DMI Element Erase call passes an erasure security key that matches the master OEM Erasure Security Key. The identify of the master OEM Erasure Security key can be provided to OEMs, who are thereby rendered able to update the any strings other than strings of Type 2, which contain manufacturing-sensitive data that should be changes only by the manufacturer.

Thus, the Manufacturing level is the highest level of security. This level (level 1) allows erasure of any string of Structure Types 1–3 (including all strings that may be erased by using the erasure security keys of lower levels 1 or 2), if the DMI Element Erase call passes an erasure security key that matches the master Manufacturing Erasure Security Key. The identify of the master Manufacturing Erasure Security key is known only to the original manufacturer, who is thus the only entity able to update Structure Type 2 strings. (In an alternative embodiment, erasure security keys may be utilized in independent fashion rather than hierarchically. For example, a level 1 erasure security key could be used to allow erasure only of Structure Type 1 strings, a level 2 erasure security key could be used to allow erasure only of Structure Type 2 strings, and so on.)

In one embodiment, the erasure security keys used by the present invention and an indicator of the corresponding structure strings within GPNV storage area 140$_3$ are embedded (e.g., hard-coded) in the sequence of instructions stored in the BIOS memory 130. In an alternate embodiment, the erasure security keys are stored in a reprogrammable nonvolatile storage device (such as a Flash memory) coupled to the bus 110.

Thus, method 200 operates as follows. Master erasure security keys are stored in BIOS ROM 130 for each of security levels 1, 2, and 3 (step 201). An erase call is received for a storage area (i.e., string of Structure Type 1, 2 or 3), the call passing a caller key (step 210). If the caller key matches the master erasure security key for the security level corresponding to the storage area to be erased, then the string is erased (steps 211, 212). Otherwise, the string is not erased (steps 211, 213). When a write call is received to write new data to the storage area (step 220), the write is performed if the storage area is erased (steps 221, 222); otherwise, the write is not performed and a DMI_Read_Only error is returned (steps 221, 223).

In the discussions above, the present invention is described with reference to DMI and the DMI BIOS Specification. It is to be appreciated, however, that the present invention is not limited to computer systems operating in accordance with the DMI BIOS Specification or with DMI, but is also applicable to systems with a BIOS which supports lock values in substantially the same manner as DMI.

In one embodiment, method 200 is implemented through a sequence of instructions executed on the processor 120. Initially, the sequence of instructions is stored in the BIOS memory 130. When the computer system is reset, the instructions are copied from the BIOS memory 130 into the RAM 150 and then accessed and executed by the processor 120. In another embodiment, the sequence of instructions is stored on another nonvolatile memory device which is part of or is coupled to the system 100, such as a hard disk, an optical disk, or a removable floppy disk. The sequence of instructions can be loaded into the RAM 150 after an initial portion of the BIOS which includes instructions on how to access the memory device (e.g., the hard disk) has been loaded into the RAM 150. Thus, as will be appreciated, method 200 may be implemented in a DMI BIOS extension.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for preventing unauthorized write access to one or more storage areas in a computer system, the method comprising the steps of:

(a) receiving a request to erase a storage area from an erase call by a caller, the erase call containing an erasure key;

(b) erasing the storage area only if the erasure key matches a master erasure key corresponding to the storage area;

(c) receiving a request to perform a write to the storage area; and (d) allowing the write only if the storage area was previously erased in step (b) and rejecting the write request otherwise.

2. The method of claim 1, wherein:

the storage area is a structure for storing string data;

steps (a)–(d) are performed under the control of a basic input/output system (BIOS);

the computer system comprises a general purpose non-volatile (GPNV) storage area for storing the structure; and the erase call is a structure element erase subfunction call of a control function call which passes to the BIOS the erasure key and a pointer to the structure.

3. The method of claim 2, wherein:

the computer system comprises a second GPNV storage area accessible only by the BIOS; and the master erasure key is stored in the second GPNV storage area.

4. The method of claim 1, wherein:

the storage area is one structure of a plurality of structures for storing string data;

steps (a)–(d) are performed under the control of a basic input/output system (BIOS);

the computer system comprises a general purpose non-volatile (GPNV) storage area for storing the plurality of structures;

each structure corresponds to one of a plurality of master erasure keys;

the erase call passes to the BIOS the erasure key and a pointer to the structure to be erased of the plurality of structures;

step (b) comprises the step of erasing the structure indicated by the pointer of the erase call only if the erasure key matches a master erasure key corresponding to the storage area; and step (d) comprises the step of allowing the write of the structure indicated by the pointer only if the structure has been erased.

5. The method of claim 4, wherein each of the master erasure keys has a priority such that a given master erasure key provides erase access in step (b) for any structure for which a lower priority master erasure key provides erase access in step (b), and the given master erasure key does not provide erase access in step (b) for at least one structure of the plurality of structures for which a higher priority master erasure key does provide erase access in step (b).

6. The method of claim 4, wherein the plurality of master erasure keys comprises a manufacturing master erasure key having a highest priority, an original equipment manufacturer (OEM) master erasure key having a middle priority, and an administrator master erasure key having a lowest priority.

7. In a computer system, a subsystem for preventing unauthorized write access to one or more storage areas of the computer system, the subsystem comprising:

(a) means for receiving a request to erase a storage area from an erase call by a caller, the erase call containing an erasure key;

(b) means for erasing the storage area only if the erasure key matches a master erasure key corresponding to the storage area;

(c) means for receiving a request to perform a write to the storage area; and (d) means for allowing the write only if the storage area was previously erased by means (b) and for rejecting the write request otherwise.

8. The subsystem of claim 7, wherein:

the storage area is a structure for storing string data;

the subsystem comprises a BIOS comprising means (a)–(d);

the computer system comprises a general purpose non-volatile (GPNV) storage area for storing the structure; and the erase call is a structure element erase subfunction call of a control function call which passes to the BIOS the erasure key and a pointer to the structure.

9. The subsystem of claim 8, wherein:

the computer system comprises a second GPNV storage area accessible only by the BIOS; and the master erasure key is stored in the second GPNV storage area.

10. The subsystem of claim 7, wherein:

the storage area is one structure of a plurality of structures for storing string data;

the subsystem comprises a BIOS comprising means (a)–(d);

the computer system comprises a general purpose non-volatile (GPNV) storage area for storing the plurality of structures;

each structure corresponds to one of a plurality of master erasure keys;

the erase call passes to the BIOS the erasure key and a pointer to the structure to be erased of the plurality of structures;

means (b) comprises means for erasing the structure indicated by the pointer of the erase call only if the erasure key matches a master erasure key corresponding to the storage area; and means (d) comprises means for allowing the write of the structure indicated by the pointer only if the structure has been erased.

11. The subsystem of claim 10, wherein each of the master erasure keys has a priority such that a given master erasure key provides erase access for means (b) for any structure for which a lower priority master erasure key provides erase access for means (b), and the given master erasure key does not provide erase access for means (b) for at least one structure of the plurality of structures for which a higher priority master erasure key does provide erase access for means (b).

12. The subsystem of claim 10, wherein the plurality of master erasure keys comprises a manufacturing master erasure key having a highest priority, an original equipment manufacturer (OEM) master erasure key having a middle priority, and an administrator master erasure key having a lowest priority.

13. A computer-readable medium having stored thereon a plurality of instructions, wherein the plurality of instructions, when executed by a processor of a computer system having one or more storage areas, cause the processor to perform the steps of:
   (a) receiving a request to erase a storage area from an erase call by a caller, the erase call containing an erasure key;
   (b) erasing the storage area only if the erasure key matches a master erasure key corresponding to the storage area;
   (c) receiving a request to perform a write to the storage area; and
   (d) allowing the write only if the storage area was previously erased in step (b) and rejecting the write request otherwise.

14. The computer-readable medium of claim 13, wherein:
   the storage area is a structure for storing string data;
   steps (a)–(d) are performed under the control of a basic input/output system (BIOS) in accordance with the plurality of instructions;
   the computer system comprises a general purpose non-volatile (GPNV) storage area for storing the structure; and
   the erase call is a structure element erase subfunction call of a control function call which passes to the BIOS the erasure key and a pointer to the structure.

15. The computer-readable medium of claim 14, wherein:
   the computer system comprises a second GPNV storage area accessible only by the BIOS; and
   the master erasure key is stored in the second GPNV storage area.

16. The computer-readable medium of claim 13, wherein:
   the storage area is one structure of a plurality of structures for storing string data;
   steps (a)–(d) are performed under the control of a basic input/output system (BIOS) in accordance with the plurality of instructions;
   the computer system comprises a general purpose non-volatile (GPNV) storage area for storing the plurality of structures;
   each structure corresponds to one of a plurality of master erasure keys;
   the erase call passes to the BIOS the erasure key and a pointer to the structure to be erased of the plurality of structures;
   step (b) comprises the step of erasing the structure indicated by the pointer of the erase call only if the erasure key matches a master erasure key corresponding to the storage area; and
   step (d) comprises the step of allowing the write of the structure indicated by the pointer only if the structure has been erased.

17. The computer-readable medium of claim 16, wherein each of the master erasure keys has a priority such that a given master erasure key provides erase access in step (b) for any structure for which a lower priority master erasure key provides erase access in step (b), and the given master erasure key does not provide erase access in step (b) for at least one structure of the plurality of structures for which a higher priority master erasure key does provide erase access in step (b).

18. The computer-readable medium of claim 16, wherein the plurality of master erasure keys comprises a manufacturing master erasure key having a highest priority, an original equipment manufacturer (OEM) master erasure key having a middle priority, and an administrator master erasure key having a lowest priority.

19. A computer system, comprising:
   a processor;
   one or more storage areas coupled to the processor; and
   a basic input/output system (BIOS) stored in memory coupled to the processor, the BIOS including instructions which, when executed by the processor, cause the processor to:
      (a) receive a request to erase a storage area from an erase call by a caller, the erase call containing an erasure key;
      (b) erase the storage area only if the erasure key matches a master erasure key corresponding to the storage area;
      (c) receive a request to perform a write to the storage area; and
      (d) allow the write only if the storage area was previously erased in step (b) and to reject the write request otherwise.

20. The computer system of claim 19, wherein:
   the storage area is one structure of a plurality of structures for storing string data;
   the computer system comprises a general purpose non-volatile (GPNV) storage area for storing the plurality of structures; and
   the erase call is a structure element erase subfunction call of a control function call which passes to the BIOS the erasure key and a pointer to the structure to be erased.

21. The computer system of claim 20, wherein:
   the computer system comprises a second GPNV storage area accessible only by the BIOS; and
   the master erasure key is stored in the second GPNV storage area.

22. The computer system of claim 19, wherein:
   the storage area is one structure of a plurality of structures for storing string data;
   the computer system comprises a general purpose non-volatile (GPNV) storage area for storing the plurality of structures;
   each structure corresponds to one of a plurality of master erasure keys;
   the erase call passes to the BIOS the erasure key and a pointer to the structure to be erased of the plurality of structures;
   the BIOS erases the structure indicated by the pointer of the erase call only if the erasure key matches a master erasure key corresponding to the storage area; and
   the BIOS allows the write of the structure indicated by the pointer only if the structure has been erased.

23. The computer system of claim 22, wherein each of the master erasure keys has a priority such that a given master erasure key provides erase access for any structure for which a lower priority master erasure key provides erase access, and the given master erasure key does not provide erase access for at least one structure of the plurality of structures for which a higher priority master erasure key does provide erase access.

24. The computer system of claim 22, wherein the plurality of master erasure keys comprises a manufacturing master erasure key having a highest priority, an original equipment manufacturer (OEM) master erasure key having a middle priority, and an administrator master erasure key having a lowest priority.

* * * * *